United States Patent [19]

Brown

[11] 4,455,699
[45] Jun. 26, 1984

[54] POLLEN TRAP FOR DOUBLE QUEEN COLONY WITH QUEEN EXCLUDER

[76] Inventor: Royden Brown, 4343 E. Keim Dr., Paradise Valley, Ariz. 85253

[21] Appl. No.: 428,050

[22] Filed: Sep. 29, 1982

[51] Int. Cl.³ .............................................. A01K 47/06
[52] U.S. Cl. ............................................. 6/4 R; 6/4 A
[58] Field of Search ................... 6/1, 4 R, 4 A, 12 M

[56] References Cited

U.S. PATENT DOCUMENTS

| | | | |
|---|---|---|---|
| 1,985,543 | 12/1934 | Killian | 6/4 A |
| 2,001,845 | 5/1935 | Larsson | 6/4 A |
| 4,241,467 | 12/1980 | Pannell | 6/1 |
| 4,322,861 | 4/1982 | Healy | 6/4 R |
| 4,351,074 | 9/1982 | Robson | 6/1 |
| 4,367,563 | 1/1983 | Ferguson et al. | 6/4 R |

*Primary Examiner*—Robert P. Swiatek
*Attorney, Agent, or Firm*—Warren F. B. Lindsley

[57] ABSTRACT

A pollen trap for a double queen colony employing a queen excluder which keeps the two queens in their respective brood nest but permits the worker bees to mingle in the pollen trap.

6 Claims, 15 Drawing Figures

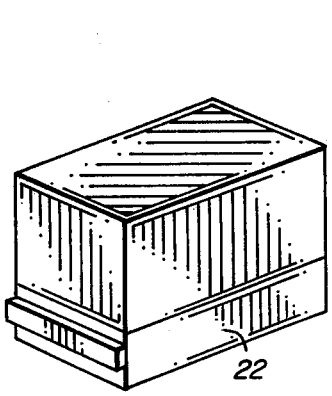
FIG. 1A
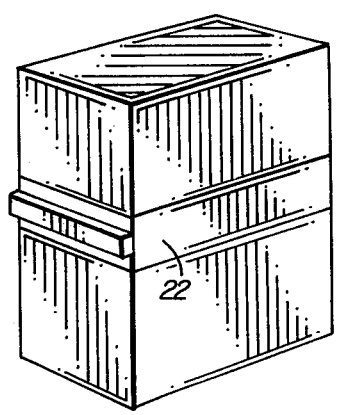
FIG. 1B
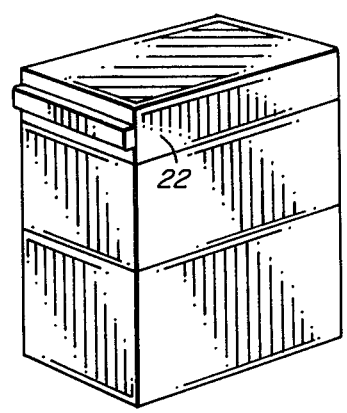
FIG. 1C
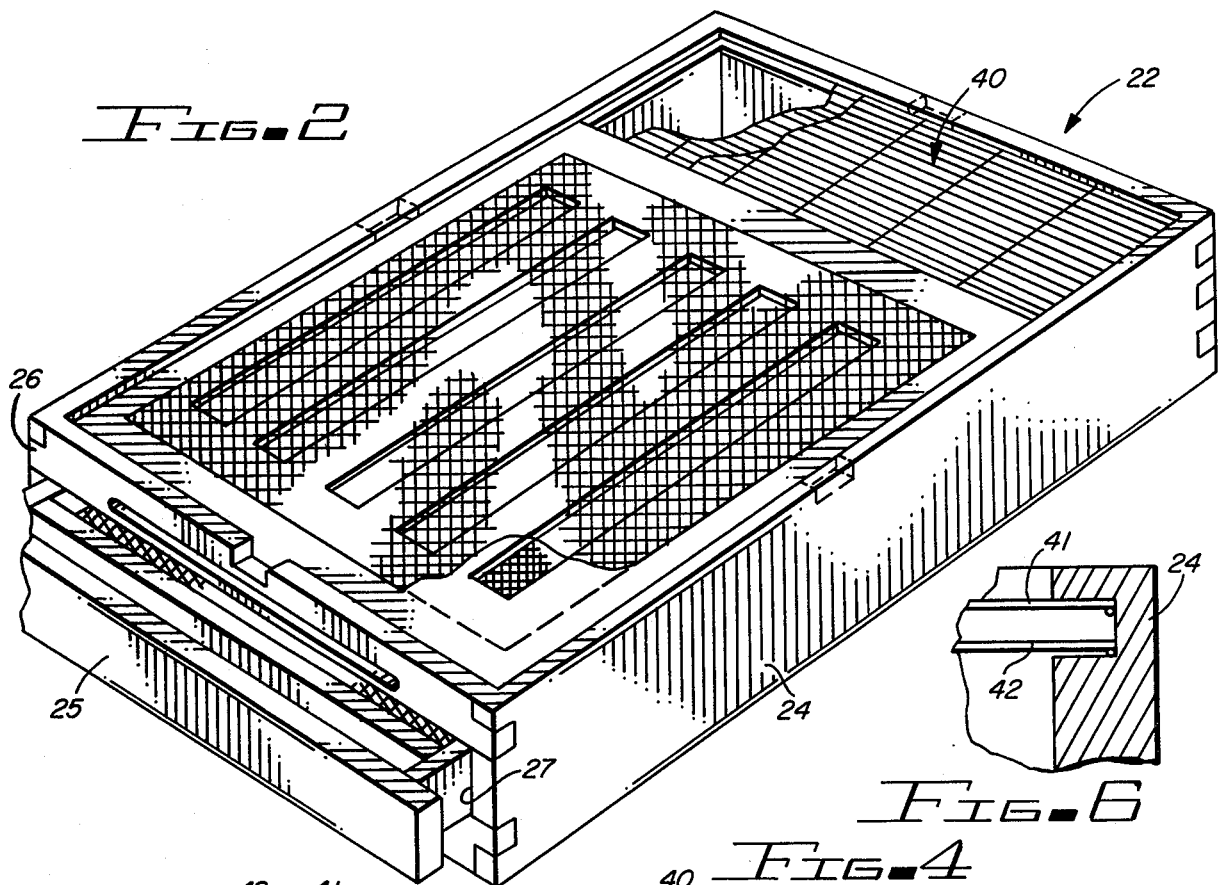
FIG. 2
FIG. 6
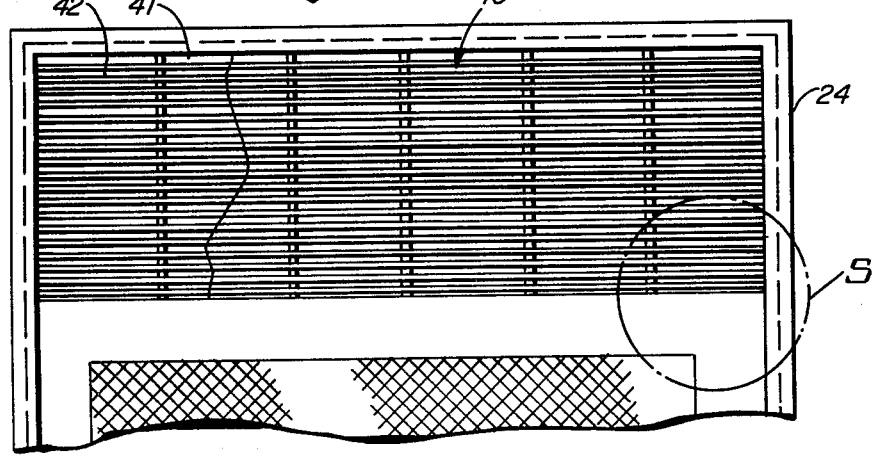
FIG. 4

U.S. Patent    Jun. 26, 1984    Sheet 3 of 3    4,455,699
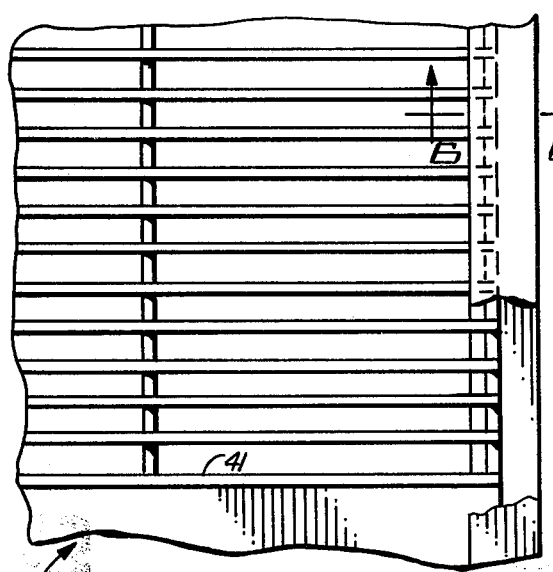
FIG-5
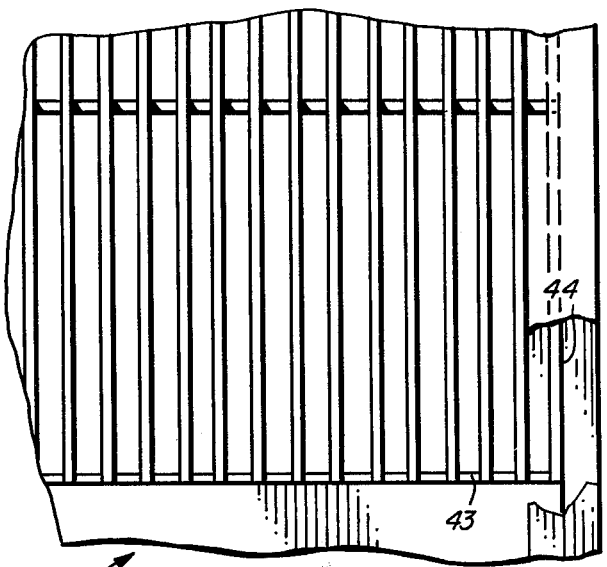
FIG-7
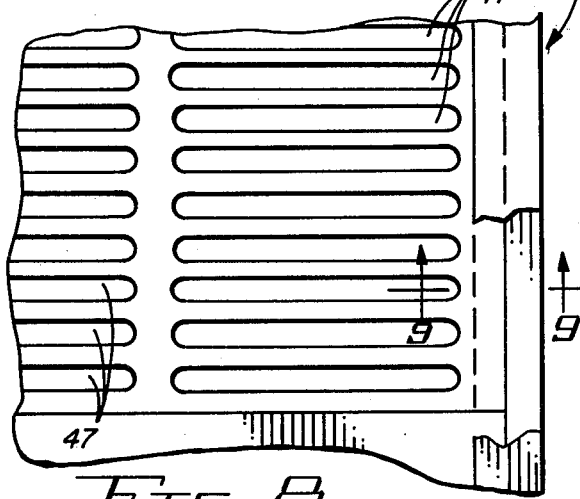
FIG-8
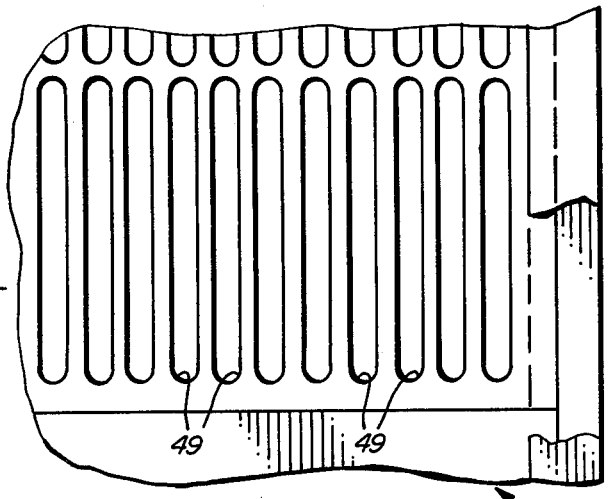
FIG-10
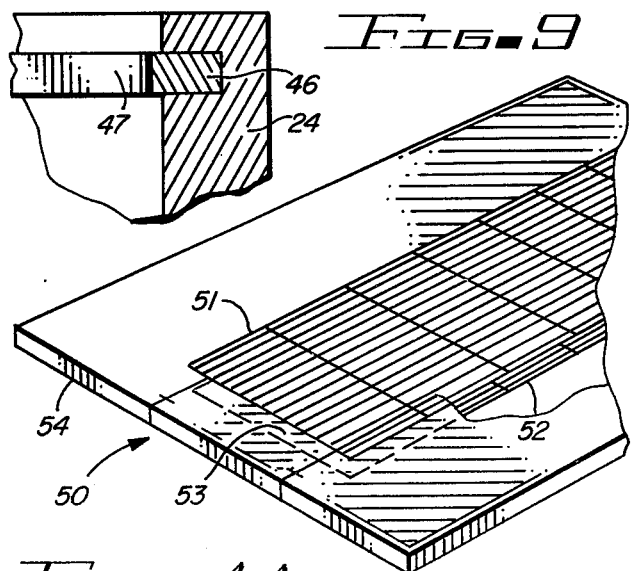
FIG-9
FIG-11
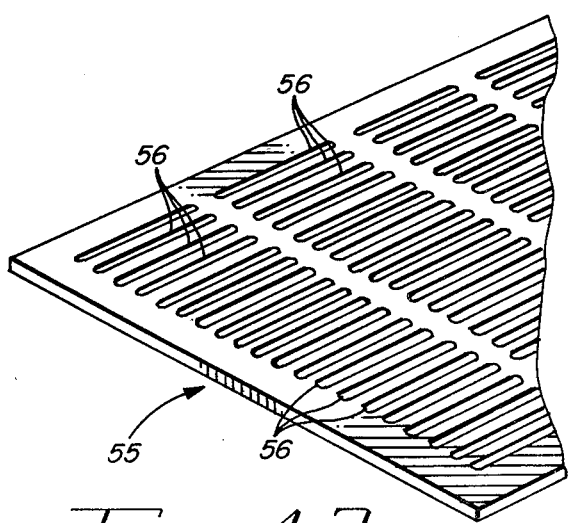
FIG-12

POLLEN TRAP FOR DOUBLE QUEEN COLONY WITH QUEEN EXCLUDER

BACKGROUND OF THE INVENTION

Floral pollen is the male seed (sperm) of flowers which brings about the fertilization of the plant. This pollen consists of tiny corpuscles, 50/1000ths of a millimeter, and is produced in so-called "anthers" which form the upper part of the "stamens" of a plant. These stamens, which vary in number according to the specie of the plant, grow up from the base of the flower as delicate filaments which are broadened into small pads at their free ends. In these pads, the pollen is formed and from these anthers, the foraging bees collect their pollen.

The worker bees who collect pollen mold it into a solid mass with a little honey and then attach the resulting kernel to the outer part of their hind legs.

When a pollen collecting worker bee returns to its hive, it stores the pollen in a separate group of cells from the honey inside the honeycombs, to be taken out again when needed.

Since pollen is considered by many the perfect food and by others a diet supplement, it is collected from honey bees by means of pollen traps which are attached to their hives. In many of the prior art uses, a grid is placed over the hive entrance so that the bees have to push through it to get into the hive. In doing so, the pollen pellets are dislodged from their legs and fall into a trough.

DESCRIPTION OF THE PRIOR ART

Although pollen traps have been placed over the hive entranceways to collect pollen, most of the devices consisted of a single piece of hardware cloth or a piece thereof folded back on itself. If a trash grid is not used, the pollen is contaminated with large amounts of trash, including dead bees accumulated in a pile between the hive entrance and the pollen trap.

Prior art pollen traps that are attached to the entranceways to the hives agitate the bees when the traps are removed and interrupt the flight of the bees into the hives causing them to gather in front of the hive often in clusters.

U.S. Pat. No. 4,337,541 discloses a pollen trap for use on honey bee colonies in which a pollen collecting drawer collects the pollen and may be removed from the hive to obtain the pollen and is an improvement over the prior art.

U.S. patent application, Ser. No. 354,882, filed Mar. 4, 1982 and entitled POLLEN TRAP FOR BEEHIVES WITH DUAL ENTRANCEWAYS, filed by the same applicant of this invention, is a further improvement of the prior art.

Other patents of interest are U.S. Pat. Nos. 3,995,338; 4,007,504 and French Pat. No. 1,223,455, which disclose pollen traps of one form or another.

Manuel R. Chepote Malatesta in his article published Jan. 1979 in the *American Bee Journal* entitled "The Andes Pollen Trap" discloses the benefits of a double layer wire mesh for removing pollen from the legs of the bees. There is no teaching of mounting this in an easily removable drawer which keeps the pollen from piling up at the entranceway of the hive.

No known prior art exists wherein a pollen trap has been utilized and effective as an excluder in a double queen colony.

SUMMARY OF THE INVENTION

In accordance with the invention claimed, a new and improved pollen trap is provided which, forming an entranceway to the hive, effectively removes a desired amount of the pollen from the legs of the bees by means of a trap that may be mounted at the middle of the hive and serves as a queen excluder.

It is, therefore, one object of this invention to provide a new and improved pollen trap.

Another object of this invention is to provide a new and improved pollen trap which may serve as a queen excluder or not depending on whether it contains a removable insert.

A further object of this invention is to provide a pollen trap that serves two bee colonies.

A still further object of this invention is to provide a new and improved pollen trap for a double queen colony employing a queen excluder which keeps the two queens in their respective brood nest but permits the worker bees to mingle in the pollen trap.

A still further object of this invention is to provide a new and improved pollen trap for a double queen colony that supports and houses a replaceable grid that traps the queens each in its own colony.

A still further object of this invention is to provide a new and improved pollen trap for a beehive employing a separate entranceway for drones.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1A is a side view of a modification of the beehive shown in FIG. 1 employing the new pollen trap at its base;

FIG. 1B is a view similar to FIG. 1A showing the novel pollen trap in the middle of the beehive;

FIG. 1C is a view similar to FIGS. 1A and 1B showing the novel pollen trap at the top of the beehive;

FIG. 2 is a perspective view of a pollen trap embodying the invention;

FIG. 4 is a partial plan view of the queen excluder grate of the pollen trap shown in FIG. 2;

FIG. 5 is an enlargement of the circled area 5 of FIG. 4;

FIG. 6 is a cross-sectional view of FIG. 5 taken along the line 6—6;

FIG. 7 is a modification of the queen excluder grid shown in FIGS. 2 and 5;

FIG. 8 is a further modification of the queen excluder grid shown in FIGS. 2, 4, 5 and 7 formed out of punched metal plates with the opening extending in one direction;

FIG 9 is a cross-sectional view of FIG. 8 taken along the line 9—9;

FIG 10 is a modification of the queen excluder grid shown in FIG. 8 with the opening extending in another direction;

FIG. 11 is a partial perspective view of a queen excluder plate for replaceably mounting in a pollen trap employing a pair of screens mounted over an opening; and FIG. 12 is a partial perspective view of a queen excluder grid for a pollen trap formed of molded plastic.

DESCRIPTION OF THE PREFERRED EMBODIMENT

Figure 1:
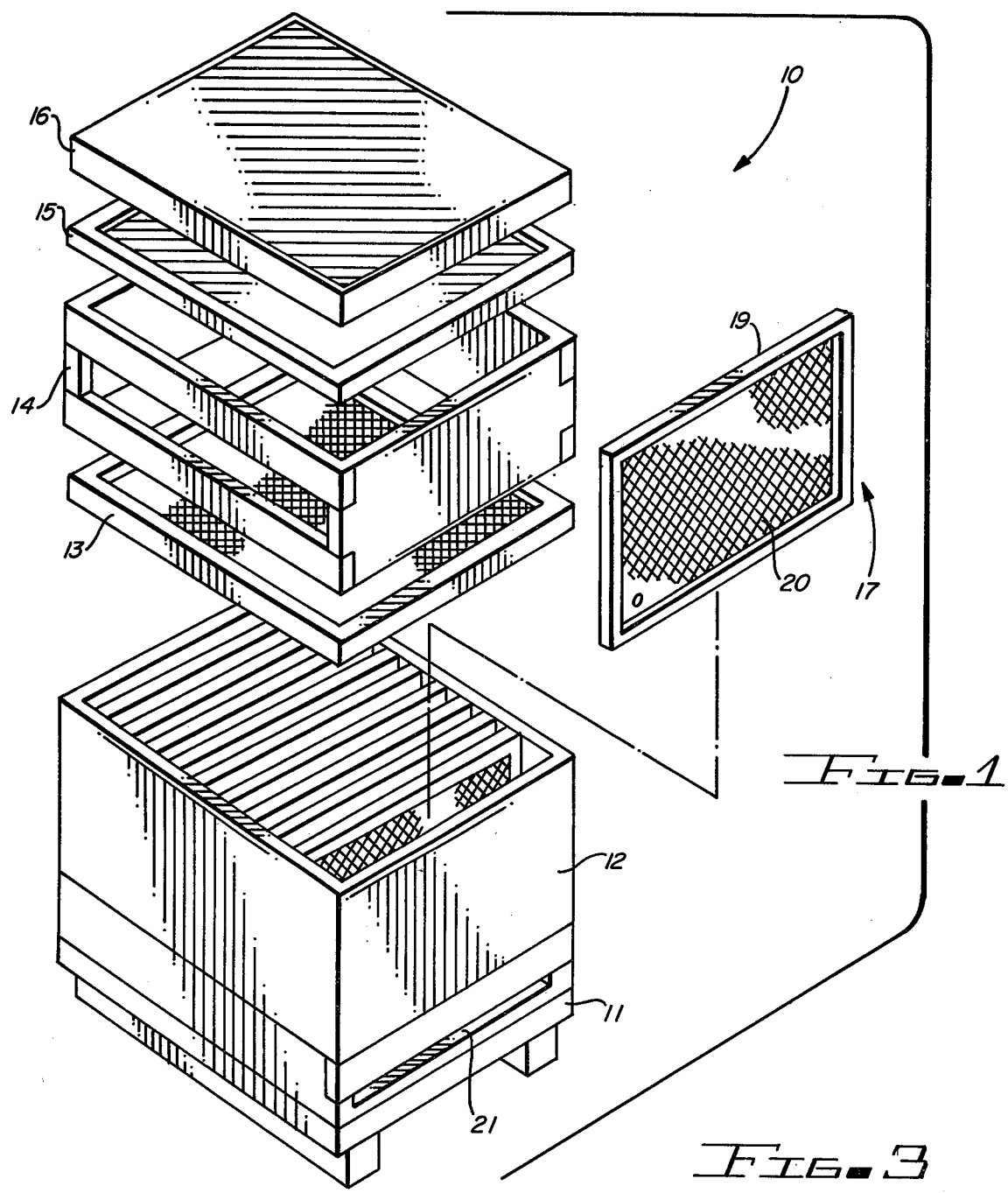
FIG. 1 is a perspective exploded view of a modern beehive.

Referring more particularly to the drawings by characters of reference, FIG. 1 discloses a modern beehive 10 comprising a pallet supported bottom board 11, a brood nest or box 12, a queen excluder 13 comprising a grate mesh formed of wire 0.163 to 0.167 inches apart, one or more honey storage supers 14, an inner cover 15 and a cover or roof 16.

The queen excluder 13 is an important piece of equipment for some beekeepers since it has spaces wide enough so that worker bees may pass through but the queen and drone bees cannot. If the queen excluder is placed above the brood nest, the queen is confined in that area and cannot lay eggs in the honey storage area of the supers.

The brood nest 12 and super 14 comprising an open ended rectangular shell contain a plurality of hanging combs or frames 17. Although ten frames are shown in the brood nest 12 in FIG. 1, many beekeepers use nine frames in the standard hive. The slightly wider spacing makes it easier to remove the combs and to inspect the brood nest.

In the super 14 (and honey storage area), beekeepers use nine frames evenly spaced. By using nine frames in a ten frame beehive, the bees, due to the wider spacing in the super than in the brood nest, draw out the cells making them deeper, thereby easier to uncap by the beekeeper.

There are also eight to twelve frame beehives with smaller or larger brood boxes, respectively. The disclosed pollen traps are built smaller or larger to fit these often called non-standard hives.

Each hanging frame 17 is rectangular in form and designed to leave a bee space all around. Lugs can be formed as extensions of the top bar 19 so that the frames can be hung from rebates in the side walls of the brood next and super or from the built out portions of these parts of the hive. Sheets of wax foundation 20 complete the well known frame construction.

An entranceway 21 into the beehive is generally formed between the bottom board 11 and the bottom of the brooder box 12, as shown in FIG. 1.

In accordance with the invention claimed, a new and improved pollen trap 22 is added to the modern beehive 10 in such a manner that the young bees in the hive are not stressed and the flight of bees coming into or leaving the hive are not unduly obstructed.

Although the pollen trap 22 is generally mounted on the bottom board 11 and between it and the brood box 12, as shown diagrammatically in FIG. 1A, it may also be in the middle of the hive as diagrammatically shown in FIG. 1B or mounted at the top of the hive as diagrammatically shown in FIG. 1C and operate effectively. The parts of the hives including the addition of the pollen trap 22 may be readily interconnected by suitable means such as the pin and socket arrangement not shown.

Figure 3:
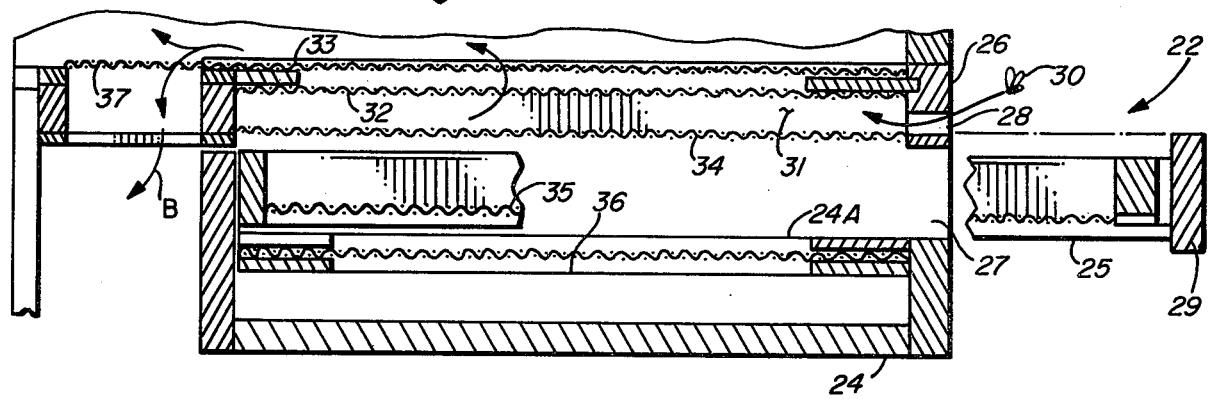
FIG. 3 is a cross-sectional view of the structure of FIG. 2 showing the direction of travel of the bees moving through the trap when used as middle pollen trap in a double queen colony.

FIGS. 2 and 3 disclose in more detail a pollen trap 22 which may be positioned in any one of the three positions diagrammatically shown in FIGS. 1A, 1B and 1C but for purposes of this invention are described in the middle of a double queen colony. This embodiment of the pollen trap comprises an open ended rectangular box-like frame 24 having a rectangular-shaped drawer 25 slidably mounted on a pair of rails fastened to the sides of frame 24 to extend into frame 24 from end 26 thereof through an opening 27. An entrance-way 28 is provided above the plate or handle 29 of the drawer for the worker bees 30 to enter the pollen trap and extends laterally across the longitudinal axis of the drawer 25. It directs the bees upwardly through a passage 31 extending between a pair of spaced grating or offset screens 32 and 33 of predetermined size mesh and a lower screen 34. Screen 34 comprises a mesh smaller than the size of the worker bees and forms a barrier over the top of drawer 25.

It should be noted that a different diameter of screen 35 is used on the bottom of the pollen drawer and another screen 36 on the bottom of frame 24, as shown in FIG. 3.

When the humidity is dry and below 30–50%, relatively small mesh screens are used on the bottom of drawer 25 and frame 24 since air circulation is not necessary to dry out the pollen. When the humidity is above 80%, a wire mesh of a relatively larger size is used on the bottom of the pollen drawer to permit the maximum circulation of air and heat through the pollen to help remove the moisture and dry the pollen.

It is proposed that a screen having 7 squares to the inch formed from wire of a diameter 0.018 of an inch be used over the pollen drawer to allow the pollen to fall through into the pollen drawer and yet keep the bees out of the pollen drawer. The 8 squares to the inch screen heretofore used is such a small mesh that, in the times of pollen flows of large granules, they pile up on the corners of the wire and eventually create a solid mass of pollen up through the wire and theoretically could permit the colony to smother. Wire mesh of 6 squares to the inch is large enough so that bees penetrate the wire and enter the pollen drawer, yet the wire is small enough that the bees cannot then escape, but are left in the pollen drawer to eat the pollen and eventually die. Neither the 8 nor the 6 squares to the inch mesh is correct for the screens over the pollen drawer. Seven squares to the inch is ideal and serves and accomplishes both tasks of allowing the pollen to free flow into the pollen drawer, regardless of the size of the granules, and yet keeps all bees out of the pollen drawer.

This trap is unique in that the two layers of a screen, namely screens 32 and 33, having a mesh employing 5 squares to the inch of a 0.023 diameter wire, are offset or staggered horizontally both up and across. This staggering of the screens causes a 25% greater efficiency in trapping the pollen from the worker bees than heretofore accomplished.

It should be noted that by increasing the sizes of the wire to 0.023, 0.032, 0.037, 0.042 and 0.047 inches in diameter, still maintaining 5 squares per inch, the staggered horizontally arranged screens can still more effectively trap the pollen from the worker bees. This range of wire diameter sizes makes the openings smaller in the 5 squares per inch without the need to resort to 6 squares per inch in the wire mesh configuration.

As indicated in FIG. 3, most of the bees enter the hive and the pollen trap through the entranceway 28 and move into and along a passageway 31 between grids or screens 32 and 34. At this point, the bees have to crawl through the opening in the grid or screen 32 and then crawl through the openings in the grid or screen 33 which are offset from the opening in screen 32. The function of the pollen traps is to force the incoming foraging bees with pollen pellets on their hind legs to twist their bodies through the opening in screens 32 and 33. In twisting through the grid formed by these screens, pollen pellets are scraped off of their legs and fall down through screen 34 into the pollen drawer 25 above screen 35 positioned at the bottom of the drawer.

As noted in FIG. 3, the worker bees B may move after passing through screen 33 of the pollen trap through passageway 37 either into the upper portions or the lower portions of the double queen colony depending on which one they are a member of.

In accordance with the teachings of this invention, a queen excluder screen or grate 40 may be provided in each pollen trap that is utilized as a middle pollen trap in a double queen colony. This grate may be permanently or replaceably mounted on frame 24 of the pollen trap 22 over the passageway 37, as diagrammatically shown in FIG. 3.

As shown in FIGS. 2, 4, 5 and 6, this grate may comprise a pair of spaced plates 41 and 42 formed of tubular bars of metal arranged to extend laterally of the length of the drawer 25 in a grate configuration.

FIG. 7 illustrates a similar arrangement except the bars 43 and 44 of grate 45 extend in a direction perpendicular to that shown in FIG. 5.

The use of the queen excluder grate in the pollen trap eliminates the need for the queen excluder plates 13 shown in FIG. 1 as part of the prior art. By placing the queen excluder plate in the pollen trap, the overall height of the beehive is reduced.

It should be noted that the use of a pollen trap in the middle of a double queen colony which employs a queen excluder grate stimulates the bees in half of the colony to work to provide a greater effort in collecting honey and pollen.

If a weak colony is placed over a pollen trap in a double queen colony, almost instantaneous build-up and increased activity in pollen gathering and nectar collecting has been noted in this colony.

The reason for this activity for rapidly changing weak colonies into strong colonies is believed to be due to:
1. Twice as much Queen Phermones in the colony;
2. Doubling the bee activity at the entrance into the pollen trap;
3. The upper brood box has nearly twice as much hive warmth;
4. Doubling of the activity of the worker bees storing nectar;
5 The pollen trap keeps the two Queens separated but permits mingling of all of the worker bees.

FIGS. 8 and 9 illustrate a grid 46 which may be punched out of metal or molded out of plastic wherein the openings 47 extend laterally across the longitudinal axis of drawer 25.

FIG. 10 illustrates a grate 48 similar to grate 46 except the openings 49 extend longitudinally of the longitudinal axis of drawer 25 when mounted in a pollen trap.

FIG. 11 illustrates an insertable and removable grate 50 which may be positioned in the pollen trap over passageway 37 as heretofore explained. As shown, this grate comprises a pair of plates 51 and 52 stapled over an opening 53 in frame 54, one on each side thereof.

FIG. 12 illustrates a modification of grate 50, wherein a molded grate 55 having a plurality of parallel slots 56 forms the queen excluder which may be permanently or temporarily positioned in the pollen trap over the passageway 37.

An improved pollen trap for beehives is thus disclosed in accordance with the stated objects of the invention and although but a few embodiments of the invention have been illustrated and described, it will be apparent to those skilled in the art that various changes and modifications may be made therein without departing from the spirit of the invention or from the scope of the appended claims.

What is claimed is:

1. A pollen trap for collecting pollen from bees as they enter a beehive positioned between the two portions of a double queen colony comprising:
   a frame having an open top and dimensioned to fit as one of the axially positioned parts of a vertically stacked beehive.
   a drawer slidably arranged in said frame to assume a substantially horizontal position in the hive,
   said drawer having a bottom surface comprising a first screen, the mesh size of which is smaller than the pollen dropped thereon by the bees,
   a second screen mounted in said frame above said drawer and having a mesh size smaller than the size of the pollen carrying bees for prohibiting them from entering the drawer,
   a pair of parallel and spacedly arranged third and fourth screens mounted on said frame, but offset above said second screen and forming an elongated space between said second screen and said pair of screens,
   said third and fourth screens having mesh openings offset from each other causing bees crawling through said pair of screens to be forced to follow a circuitous path, divesting their legs of a substantial portion of the pollen carried thereon,
   an entranceway for the pollen carrying bees into the pollen trap positioned adjacent the front and above said drawer and connected with one end of said space between said second screen and said pair of screens,
   said frame defining a passageway behind said drawer for the pollen collecting bees which passageway interconnects the first portion and second portion of the double queen colony so the pollen collecting bees after passing said third and fourth screens can enter either portion, and
   a grate having an opening therein small enough to preclude a queen from passing therethrough mounted in the pollen trap over said passageway.

2. The pollen trap set forth in claim 1 wherein:
   said grate comprises a pair of spaced plates, each plate formed of a plurality of spaced parallel rods.

3. The pollen trap set forth in claim 1 wherein:
   said grate comprises a plurality of parallel slots stamped out of a sheet of metal.

4. The pollen trap set forth in claim 1 wherein:
   said grate is formed of plastic comprising a plurality of parallel slots molded therein.

5. The pollen trap set forth in claim 1 wherein:
   said grate is removably mounted in said frame.

6. The pollen trap set forth in claim 1 wherein:
   said grate comprises a flat wooden plate having an opening extending therethrough with a metallic screen mounted on each flat surface thereof over said opening.

* * * * *